United States Patent Office 3,558,230
Patented Jan. 26, 1971

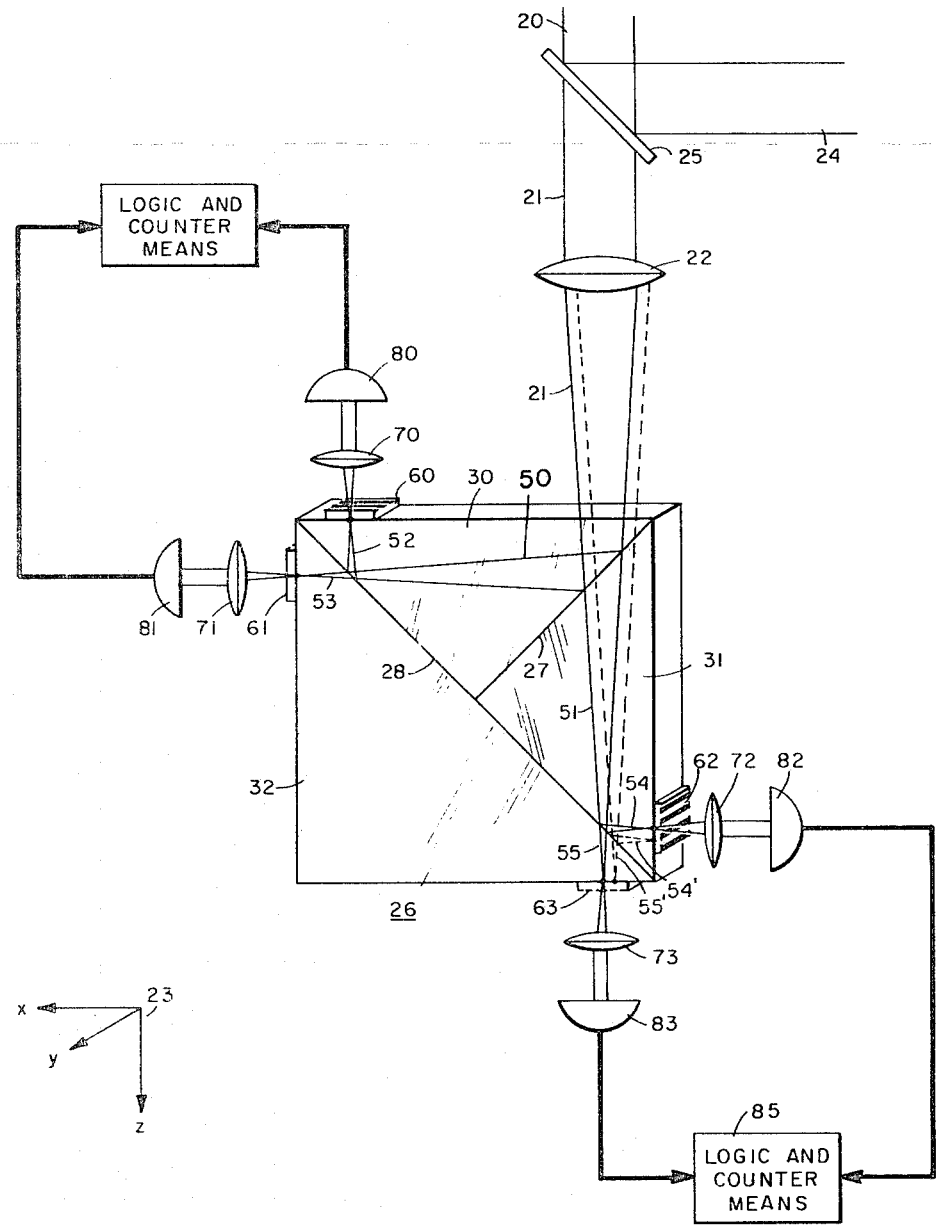

3,558,230
LIGHT BEAM DEFLECTION SENSOR
Vernon J. Fowler, East Meadow, N.Y., assignor to General Telephone & Electronics Laboratories Incorporated, a corporation of Delaware
Filed May 28, 1969, Ser. No. 828,679
Int. Cl. G01b *11/26, 27/14*
U.S. Cl. 356—138                                10 Claims

ABSTRACT OF THE DISCLOSURE

An apparatus for detecting the two-dimensional deflection of an input light beam from a reference direction. The input beam is divided into four split beams by a prism block. Each of the split beams passes through one of four ruled gratings mounted on the block. Detecting means received the light outputs from the gratings and compare them to determine the input beam deflection.

BACKGROUND OF THE INVENTION

This invention relates to deflection sensors and in particular to an apparatus for detecting the deflection of a highly collimated beam of light. The invention described herein was made in the performance of work under a NASA contract and is subject to the provisions of section 305 of the National Aeronautics and Space Act of 1958, Public Law 85–568 (72 Stat. 435; 42 U.S.C. 2457).

There are various known techniques for spatially deflecting a beam of light. Systems which employ mechanically driven mirrors or electro-optic crystals to achieve deflection are among the most common. Optical systems for precisely deflecting a highly collimated beam of light, such as a laser beam, have become increasingly important. For example, deflected or "steered" laser beams are presently used to expose tiny microphotographic patterns during integrated circuit manufacture.

In optical deflection systems it is often desirable to have an electrical signal which continuously indicates the position of the deflected beam. This signal can be used to monitor the performance of the deflector or to operate a feed-back system for controlling the deflector. A deflection indicator which can produce digital output signals is especially desirable in systems which use a computer to control the optical deflector system. The above-mentioned microphotography application is, for example, particularly suited to computer control due to the requirements of high precision anl large volume associated with integrated circuit manufacture.

A known deflection sensing scheme which produces a digital output signal employs precisely ruled optical gratings (called Ronchi rulings) which consist of alternately transparent and opaque regions or stripes of equal width. A sample of the deflected beam is focused on one of these ruled gratings and a photodetector is placed behind the grating. Generally, the diameter of the spot of focused light is set approximately equal to the width of one stripe. As the beam is deflected, the light spot passes across the grating and is alternately blocked from and transmitted to the photodetector. The photodetector output is thus an alternating signal, each half cycle of which corresponds to a beam movement of one spot diameter. The number of spot diameters which the light spot moves is determined by counting the photodetector output cycles.

The described system is not, however, capable of determining the direction or "sense" of beam deflection. This deficiency is overcome by splitting the sampled beam and passing a portion of it through a second Ronchi ruling and photodetector combination. The second Ronchi ruling is positioned such that the output of the second photodetector will be out of phase with the output of the first photodetector by a predetermined amount. The lead-lag relationship between the two photodetector outputs is then resolved to determine the deflection sense.

The respective positions and alignments of the two Ronchi rulings is critical to the performance of the described system. Each ruling should have the portion of the beam which crosses its stripes do so at the same angle (preferably perpendicular to the stripes). In addition, the above-mentioned phase difference should be close to 90° so that the lead-lag relationship between photodetectors can be readily discerned by the appropriate electronic circuitry. (Phase differences of 0° or 180° would yield no directional information.) This means that the relative alignment of the rulings must be controlled to a tolerance of less than the width of an individual stripe. In practice, set-up and maintenance of such close tolerances is difficult to achieve.

The complexity of alignment problems is further complicated in the usual case where it is necessary to detect the deflection of a beam in two dimensions. This is accomplished by initially splitting the sampled beam and then employing two deflection sensing systems as described, each of which functions in a given dimension. It is desirable to establish and maintain the orthogonality of the two systems so that the position of the beam can be determined in terms of true rectangular coordinates. Therefore, in addition to previously mentioned alignment requirements, the Ronchi ruling pair of each system must be precisely aligned with respect to the rulings of its conjugate pair.

SUMARY OF THE INVENTION

The present invention is directed to an improved apparatus for determing the two-dimensional deflection of an input light beam from a reference direction. A focusing lens is disposed in the path of the beam and a four-way beam splitter is positioned to receive the beam emerging from the focusing lens. The four-way beam splitter comprises a prism block having two internal semireflecting surfaces which are perpendicular to each other. Each of the semireflecting surfaces is oriented at an angle of 45° to the reference direction. The prism is positioned such that the beam is first divided by one of the semireflecting surfaces and then each of the divided portions of the beam is redivided by the other semireflecting surface. In this manner the input beam in converted into four split beams which emerge from four different sides of the prism block, each of the split beams having travelled substantially the same optical distance within the block.

Four optically ruled gratings are mounted upon the block, each positioned in the path of one of the split beams. Detecting means are provided for receiving the light outputs emerging from the four gratings. The detecting means compares the outputs of two of the gratings to determine the deflection of the input beam in a first direction orthogonal to the reference direction and compares the outputs of the other two gratings to determine the direction of deflection of the input beam in a second direction orthogonal to the reference direction and the first direction.

Further objects and features of the invention will be more fully and clearly understood from the following description taken in conjunction with the accompanying drawing.

BRIEF DESCRIPTION OF THE DRAWING

The drawing is a schematic representation of a preferred embodiment of the invention.

DESCRIPTION OF THE PREFERRED EMBODIMENT

Referring now to the drawing, there is shown an apparatus in accordance with the invention for determining the deflection of a collimated beam of light 20. The beam 20 is divided by a beam splitter 25 into a main beam 24 and a sampled input beam 21 which is used for measuring deflection. Beam 21, when not deflected, propagates in a reference direction defined by the z-direction of coordinate axes 23. Beam 21, when two-dimensionally deflected, has components of deflection in the x and y directions as defined by coordinate axes 23 (where the y-direction is perpendicular to the plane of the paper).

The beam 21 passes through focusing lens 22 and is incident upon four-way beam splitter 26. Beam splitter 26 is a cubic prism block having internal semireflecting surfaces 27 and 28 which are perpendicular to each other. Surfaces 27 and 28 are each oriented at angles of 45° to the z-direction. Beam splitter 26 can be constructed by mounting two small right triangular isosceles prisms, 30 and 31, upon a large right triangular isosceles prism 32. A semireflecting film enclosed between common faces of the prisms can form semireflecting surfaces 27 and 28.

Input beam 21 enters the prism block 26 and is divided by semireflecting surface 27 into split beams 50 and 51, which are, in turn, divided into split beams 52, 53, 54 and 55 by semireflecting surface 28. Mounted on the block 26 in the path of the emerging split beams are four Ronchi rulings, 60, 61, 62 and 63. Lenses 70, 71, 72 and 73 collect the light emerging from their respective Ronchi rulings and transmit it to photodetectors 80, 81, 82 and 83.

In the embodiment of FIG. 1, rulings 62 and 63 are aligned for deflection detection in the x-direction. Ronchi rulings 62 and 63 have their ruled stripes aligned perpendicular to the x-direction and parallel to the y-direction with the stripes of ruling 62 lying in the y-z plane and the stripes of ruling 63 lying in the x-y plane. It is therefore seen that when the input beam is deflected in the x-direction, split beams 54 and 55 move perpendicularly across the stripes of rulings 62 and 63 respectively, as is shown by dotted beams 54' and 55'. For deflection of input beam 21 in the y-direction, however, split beams 54 and 55 do not cross the ruling stripes, but rather move parallel to them.

Rulings 60 and 61 have their ruled stripes aligned perpendicular to the y-direction. Therefore, when the beam 21 is deflected in the y-direction, split beams 52 and 53 move perpendicularly acorss the stripes of rulings 60 and 61 respectively in the same manner as described for split beams 54 and 55.

The operation of the apparatus will now be described with reference to deflection in the x-direction bearing in mind that the apparatus operates analogously in detecting deflection in the y-direction. As noted above, when the input beam 21 is deflected in the x-direction, split beams 54 and 55 move perpendicularly across the stripes of rulings 62 and 63. The stripes of these rulings periodically interrupt the reception of light by the photodetectors and the outputs of photodetectors 82 and 83 are therefore series of sinusoidally shaped pulses. By counting the number of output pulses of either photodetector the gross movement of the beam can be discerned. This count alone, however, does not yield the beam position since the deflection direction is not known. For example, if the output count from photodector 82 was ten pulses it would not be known whether split beam 54 had passed over ten successive stripes on ruling 62 (with significant net deflection) or whether it had passed back and forth over a single stripe five times (with no deflection). To provide this information rulings 62 and 63 and associated photodetectors 82 and 83 are used together, in a manner known in the art, to determine the direction or "sense" of deflection. Rulings 62 and 63 are displayed with respect to each other so that a predetermined relative phase shift, for example 90°, is introduced between the outputs of photodectors 82 and 83. This lead-lag relationship between photodetector outputs 82 and 83 is determinative of the deflection direction and this determination is made by logic and counter means 85. Means 85 also incorporates a counter which counts pulses by either adding or subtracting them in accordance with the directional determination. The net x-direction deflection at any time is represented by the digital output count of means 85 with, for example, a positive count indicating a net positive x-deflection and a negative count indicating a net negative x-deflection. Logic and counter means 85 may be, for example, a Hewlett Packard type 5280A counter used in conjunction with Hewlett Packard type 5285A plug-in logic unit.

It will be appreciated that substantial advantages accrue from the use of four-way beam splitter 26 in conjunction with attached Ronchi rulings 61–63. The symmetry of the beam splitter insures that each split beam 52–55 travels substantially the same distance within the prism block thus facilitating the focussing of each split beam on its respective Ronchi ruling. The Ronchi ruling pairs 60, 61 and 62, 63 are permanently mounted on the block 26 with each pair having the spaced relationship required to yield the desired output phase difference as described above. In addition, the Ronchi ruling pair 60, 61 is mounted on the block with stripes perpendicular to those of pair 62, 63 so that the position of the input beam can be determined in true rectangular coordinates. Most importantly, each of the above-mentioned alignment settings of the four Ronchi rulings is permanent so that extensive alignments are not required each time the apparatus is vibrated or moved.

It is to be understood that the invention is not limited to the specific embodiment herein described, but may be made in other ways without departures from its spirit as defined by the claims which follow.

What is claimed is:

1. Apparatus for determining the two-dimensional deflection of a light beam from a reference direction comprising:
   (a) a four-way beam splitter positioned to receive said input beam, said beam splitter comprising a prism block having two internal semireflecting surfaces which are perpendicular to each other, said beam splitter converting said beam into four split beams;
   (b) four ruled gratings, each mounted upon said block in the path of one of the said split beams; and
   (c) detecting means for receiving the light outputs emerging from said four gratings, said means comparing the outputs of two of said gratings to determine the deflection of said input beam in a first direction which is orthogonal to said reference direction and comparing the outputs of the other two gratings to determine the direction of deflection of said input beam in a second direction which is orthogonal to said reference direction and said first direction.

2. The deflection determining apparatus as defined by claim 1 wherein two of said gratings have their ruled lines oriented perpendicular to said first direction and the other two gratings have their ruled lines oriented perpendicular to said second direction.

3. Apparatus for determining the two-dimensional deflection of an input light beam from a reference direction comprising:
   (a) a four-way beam splitter positioned to receive said input beam, said beam splitter comprising a prism block having two internal semireflecting surfaces, said surfaces being perpendicular to each other and each of said surfaces being oriented at an angle of 45° to said reference direction, whereby said beam is converted into four split beams which emerge from four sides of said block each having travelled substantially the same optical distance within said block;
   (b) four ruled gratings each mounted upon said block in the path of one of said split beams;
   (c) four photodetectors, each positioned to receive the light emerging from one of said four gratings;
   (d) first means for comparing the outputs of two of said photodetectors to determine the deflection of said input beam in a first direction which is orthogonal to said reference direction; and (e) second means for comparing the outputs of the other two photodetectors to determine the direction of deflection of said input beam in a second direction which is orthogonal to said reference direction and said first direction.

4. The deflection determining apparatus as defined by claim 3 wherein two of said gratings have their ruled lines oriented perpendicular to said first direction and the other two gratings have their ruled lines oriented perpendicular to said second direction.

5. The deflection determining apparatus as defined by claim 4 further comprising a focusing lens positioned to receive said input beam before passage of said input beam to said beam splitter.

6. The deflection determining apparatus as defined by claim 5 further comprising four light collecting lenses positioned between said four gratings and said four photodetectors.

7. Apparatus for determining the two-dimensional deflection of a light beam from a reference direction comprising:
(a) a two-way beam splitter positioned to receive said light beam and divide said light beam into a main beam and an input beam;
(b) a focusing lens positioned in the path of said input beam;
(c) a four-way beam splitter positioned to receive the input beam emerging from said focusing lens, said four-way beam splitter comprising a cubic prism block having two internal semireflecting surfaces, said surfaces being perpendicular to each other and each of said surfaces being oriented at an angle of 45° to said reference direction, whereby said input beam is converted into four split beams which emerge from four sides of said block each having travelled substantially the same optical distance within said block;
(d) first, second, third and fourth ruled gratings mounted upon said block in the path of said four split beams, said first and second gratings having their ruled lines oriented perpendicular to a first direction and said third and fourth gratings having their ruled lines oriented perpendicular to a second direction, said first, second, and reference directions being mutually orthogonal;
(e) first, second, third and fourth photodetectors positioned to receive the light emerging from said first, second, third and fourth gratings respectively;
(f) first means for comparing the outputs of said first and second photodetectors to determine the deflection of said input beam in said first direction; and
(g) second means for comparing the outputs of said third and fourth photodetectors to determine the deflection of said input beam in said second direction.

8. The deflection determining apparatus as defined by claim 7 wherein said first and second ruled gratings are displaced with respect to each other by an amount such that the outputs of said first and second photodetectors are out of phase with each other by a first predetermined phase difference and said third and fourth ruled gratings are displaced with respect to each other by an amount such that the outputs of said third and fourth photodetectors are out of phase with each other by a second predetermined phase difference.

9. Apparatus for receiving an input light beam and generating first, second, third and fourth light pulse outputs in response to the two-dimentional deflection of said light beam from a reference direction, said first and second light pulse outputs being responsive to the deflection of said input beam in a first direction which is orthogonal to said reference direction and said third and fourth light pulse outputs being responsive to the deflection of said input beam in a second direction which is orthogonal to said reference direction and said first direction, comprising:
(a) a four-way beam-splitter positioned to receive said input beam, said beam-splitter comprising a cubic prism block having two internal semireflecting surfaces, said surfaces being perpendicular to each other and each of said surfaces being oriented at an angle of 45° to said reference direction, whereby said input beam emerges from four sides of said block as first, second, third and fourth split beams each having travelled the same optical distance within said block; and
(b) first, second, third and fourth ruled gratings mounted upon said block in the paths of said first, second, third and fourth split beams respectively, said first and second gratings having their ruled lines oriented perpendicular to said first direction and said second and third gratings having their ruled lines oriented perpendicular to said second direction.

10. The light pulse generating apparatus as defined by claim 9 wherein said first and second ruled gratings are displaced with respect to each other by an amount such that said first and second light pulse outputs are out of phase with each other by a first predetermined phase difference, and said third and fourth ruled gratings are displaced with respect to each other by an amount such that said third and fourth light pulse outputs are out of phase with each other by a second predetermined phase difference.

References Cited
UNITED STATES PATENTS

| | | | |
|---|---|---|---|
| 1,662,693 | 3/1928 | Astafiev | 350—162 |
| 3,245,307 | 4/1966 | DeLang | 356—169 |
| 3,333,053 | 7/1967 | Back | 350—173 |
| 3,344,703 | 10/1967 | Milton | 350—173 |

RONALD L. WIBERT, Primary Examiner

J. ROTHENBERG, Assistant Examiner

U.S. Cl. X.R.

250—237; 350—162, 173; 356—152, 170, 172